(12) United States Patent
Tsumori et al.

(10) Patent No.: US 7,712,966 B2
(45) Date of Patent: May 11, 2010

(54) CYLINDRICAL ROLLER BEARING

(75) Inventors: Yukihisa Tsumori, Kuwana (JP); Yosuke Oya, Kuwana (JP)

(73) Assignee: NTN Corporation, Osaka (JP)

( * ) Notice: Subject to any disclaimer, the term of this patent is extended or adjusted under 35 U.S.C. 154(b) by 562 days.

(21) Appl. No.: 11/663,777

(22) PCT Filed: Sep. 16, 2005

(86) PCT No.: PCT/JP2005/017132

§ 371 (c)(1),
(2), (4) Date: Mar. 26, 2007

(87) PCT Pub. No.: WO2006/035620

PCT Pub. Date: Apr. 6, 2006

(65) Prior Publication Data

US 2007/0263952 A1    Nov. 15, 2007

(30) Foreign Application Priority Data

Sep. 27, 2004    (JP)    ............................. 2004-279727

(51) Int. Cl.
*F16C 33/58*    (2006.01)
(52) U.S. Cl. .................. 384/450; 384/564; 384/565
(58) Field of Classification Search ................ 384/450, 384/564, 565, 568, 571
See application file for complete search history.

(56) References Cited

U.S. PATENT DOCUMENTS

| 6,033,123 | A  | * | 3/2000 | Sato et al. ................... 384/571 |
| 6,086,262 | A  | * | 7/2000 | Matsumoto ................. 384/571 |
| 6,379,049 | B1 | * | 4/2002 | Shibazaki et al. ........... 384/450 |
| 7,048,445 | B2 | * | 5/2006 | Torisawa .................... 384/450 |

FOREIGN PATENT DOCUMENTS

| JP | 58-043609   | 9/1983  |
| JP | 4-078321    | 3/1992  |
| JP | 5-87330     | 11/1993 |
| JP | 7-012119    | 1/1995  |
| JP | 8-320022    | 12/1996 |
| JP | 9-210055    | 8/1997  |
| JP | 2003-278745 | 10/2003 |
| JP | 2004-011821 | 1/2004  |
| JP | 2004-060860 | 2/2004  |

* cited by examiner

*Primary Examiner*—Thomas R Hannon
(74) *Attorney, Agent, or Firm*—Clark & Brody

(57) ABSTRACT

A relief groove (23) is provided at a corner in which a track surface (21) and a flange surface (24) cross, in an inner ring (20) of a cylindrical roller bearing. A chamfer (42) is provided at a corner part in which a rolling surface (41) and an end surface (43) cross, in a cylindrical roller (40). When it is assumed that the height of the chamfer (42) from the rolling surface (41) is "h" and the curvature radius of the chamfer is "R", the relation such that $1.0 \leqq R/h \leqq 1.5$ is satisfied.

4 Claims, 5 Drawing Sheets

CYLINDRICAL ROLLER BEARING

TECHNICAL FIELD

The present invention relates to a cylindrical roller bearing suitable for supporting a shaft rotating at high speed and high load in a wind power generation speed-up gear, a machine tool, a jet engine, a gas turbine and the like.

BACKGROUND ART

A general cylindrical roller bearing comprises an inner ring having a track surface around its outer periphery, an outer ring having a track surface around its inner periphery, a plurality of cylindrical rollers arranged between the track surface of the inner ring and the track surface of the outer ring so that they can roll freely, and a retainer retaining the cylindrical rollers at a predetermined intervals in a circumferential direction.

For example, when the inner ring comprises flanges at both ends, a relief groove is provided at the corner in which the flange surface of the flange and the track surface of the inner ring cross. This relief groove is provided as a relief region when the track surface and the flange surface are ground. In addition, a chamfer is provided at the corner part in which the rolling surface and the end surface of the cylindrical roller cross. The axial dimension between the flange surfaces opposed to each other in an axis direction is set a little larger than the length of the cylindrical roller, whereby a guide clearance is provided between the cylindrical roller and the flange.

According to the cylindrical roller bearing described above, since the rolling surface of the cylindrical roller and the track surface of the track ring are linearly in contact with each other, it has a high load facility of a radial load and it is suitable for high-speed rotation, but a heating value is great at the time of high-speed rotation as compared with a ball bearing, and it has a problem in that a lot of heat and abrasion are likely to be generated at the sliding contact part between the cylindrical roller and the flange, especially. More specifically, the cylindrical roller has a degree of freedom for inclination by the above-described guide clearance, so that it is inevitable that the axis line of the cylindrical roller is inclined with respect to the axis line of the bearing, that is, a skew is generated at the time of rotation of the bearing. When the cylindrical roller is skewed, an axial component is generated in the driving force applied from the track surface of the rotating side, and it becomes axial thrust force F that presses the end of the cylindrical roller to one flange. Thus, the friction resistance at the sliding contact part between the cylindrical roller and the flange surface is increased, which causes heat generation and abrasion in some cases.

Various kinds of improvements have been proposed for the above problems. For example, according to Japanese Patent Publication No. 58-43609, the height of a relief groove is made larger than that of a chamfer of a cylindrical roller, and a tapered surface extending to the outside in an axial direction at a predetermined angle is provided in a flange surface, to improve the lubricant state of the above sliding contact part.

In addition, according to Japanese Unexamined Patent Publication No. 7-12119, the outer peripheral part of the end surface of a cylindrical roller comes into contact with a flange surface at a part on the base end side shifted from the top end of the flange surface when the cylindrical roller is skewed, to reduce the edge load at the above sliding contact part as compared with a case where the outer peripheral part of the end face of the cylindrical roller comes into contact with the top end of the flange surface.

As described above, since the cylindrical roller has the degree of freedom for inclination by the guide clearance, while the cylindrical roller rotating and revolving at the time of the bearing rotation, it constantly varying its posture within a maximum skew angle. As schematically shown in FIG. 1, when a cylindrical roller 1 is skewed at a skew angle $\theta$ smaller than a maximum skew angle $\theta max$, the cylindrical roller 1 is pressed to one side in the axial direction by the axial thrust force F and guided to roll in the state in which it is pressed to one flange surface 2a of an inner ring 2. At this time, the contact state between the cylindrical roller 1 and the flange surface 2a varies with the skew angle $\theta$ as follows.

That is, when the skew angle $\theta$ is in a range $0 < \theta < \theta 1$, a boundary B1 between an end surface 1a and a chamfer 1b of the cylindrical roller 1 is in contact with a boundary B2 between a flange surface 2b and a relief groove 2c as shown in FIG. 2 (contact point is shown by a black circle ●), and when the skew angle $\theta$ is in a range $\theta 1 < \theta < \theta 2$, the boundary B1 between the end surface 1a and the chamfer 1b of the cylindrical roller 1 is in contact with the flange surface 2b as shown in FIG. 3 (contact point is shown by a black circle ●). Thus, when the skew angle $\theta$ is about to become approximately $2\theta$, the boundary B1 between the end surface 1a and the chamfer 1b of the cylindrical roller 1 is in contact with a boundary B3 between the flange surface 2b and a flange surface chamfer 2d (not shown). Then, both ends of the cylindrical roller 1 come in contact with both flange surfaces 2a, respectively and the skew angle $\theta$ reaches the maximum skew angle $\theta max$ (not shown).

FIG. 4 shows the relation (solid line) between the skew angle $\theta$ of the cylindrical roller 1 and the contact surface pressure P between the cylindrical roller 1 and the flange 2a, and the relation (dotted line) between the skew angle $\theta$ and the axial thrust force F applied to the cylindrical roller 1. As shown in FIG. 4, the axial thrust force F is increased as the skew angle $\theta$ is increased.

In the range $0 < \theta < \theta 1$, the contact surface pressure P is relatively steeply increased as the skew angle $\theta$ is increased. This is related to the fact that the cylindrical roller 1 and the flange 2a come into contact with each other at the boundary B1 and the boundary B2 (shown in FIG. 2), and the axial thrust force F is increased as the skew angle $\theta$ is increased. Especially, in the range $\theta 0 < \theta < \theta 1$ (region shown by crossed hatching in FIG. 4), it has been confirmed from a test that the contact surface pressure P becomes a surface pressure level P0 or more in which the contact part is abraded.

When the skew angle becomes more than $\theta 1$, the contact surface pressure P is reduced to the surface pressure level P0 or less, and it makes a stable shift at a relatively low value although the skew angle $\theta$ is increased. This means that the contact state between the cylindrical roller 1 and the flange 2a is shifted from the contact between the boundary B1 and the boundary B2 (shown in FIG. 2) to the contact between the boundary B1 and the flange surface 2b (shown in FIG. 3).

When the skew angle $\theta$ becomes approximately $\theta 2$, the contact surface pressure P is rapidly increased again and when the skew angle $\theta$ becomes $\theta 2$, it becomes the surface pressure level P0 or more. This means that the contact state between the cylindrical roller 1 and the flange 2a is shifted from the contact between the boundary B1 and the flange surface 2b (shown in FIG. 3) to the contact state between the boundary B1 and the boundary B3.

As described above, the contact surface pressure P between the cylindrical roller and the flange becomes the surface pressure level P0 or more in which the contact part is abraded before the skew angle $\theta$ becomes the maximum skew angle θmax, that is, in the range θ0<θ<θ1 and θ2<θ<θmax, which is attributed to the major factor of the heat generation and abrasion at the contact part.

However, according to the above Japanese Patent Publication No. 58-43609, there is no recognition of the above phenomenon, so that its measures are not proposed. Furthermore, according to the above Japanese Unexamined Patent Publication No. 7-12119, although the contact state between the outer peripheral part of both end surfaces of the cylindrical roller and the flange surface at the maximum skew angle θmax is regulated, there is no recognition of the above phenomenon generated at the stage before the skew angle θ reaches the maximum skew angle θmax, so that its measures are not proposed also.

The same applicant of this application has proposed a cylindrical roller bearing suitable for the higher-speed rotation in Japanese Unexamined Patent Publication No. 2003-278745. The invention disclosed in the above document is characterized in that a critical skew angle θ1 that is a maximum skew angle in which the boundary between the end surface of a cylindrical roller and a chamfer comes into contact with the boundary between a flange surface and a relief groove is regulated to a predetermined angle or less. Thus, the contact state between the cylindrical roller and the flange is shifted from the contact between the boundaries (shown in FIG. 2), to the contact between the boundary and the flange surface (shown in FIG. 3) at a smaller skew angle, so that a contact surface pressure can be reduced.

The above Japanese Unexamined Patent Publication No. 2003-278745 will be described in detail hereinafter. As shown in an enlarged view in FIG. 5, a relief groove 2c is provided at a corner in which a flange surface 2b of each flange 2a and a track surface 2e of an inner ring 2 cross. The relief groove 2c is provided as a relief region when the track surface 2e and the flange surface 2b are ground mainly. The flange surface 2b is tapered such that it is gradually opened in an outer diameter direction, and a chamfer 2d is provided at a corner part in which the flange surface 2b and an outer diameter surface 2f of the flange 2a cross. Furthermore, a chamfer 1b is provided at the corner part in which a rolling surface 1c and an end surface 1a of the cylindrical roller 1 cross. Furthermore, the axial dimension between the flange surfaces 2b opposed to each other in an axial direction is made a little larger than the length of the cylindrical roller 1, so that a guide clearance S is provided between the end surface 1a of the cylindrical roller 1 and the flange surface 2b.

A height "H" of the relief groove 2c from the track surface 2e of the inner ring 2 is set to be larger than a height "h" of the chamfer 1b from the rolling surface 1c of the cylindrical roller 1. Thus, a difference δ(δ=H−h) between the height "H" of the relief groove 2c and the height "h" of the chamfer 1b of the cylindrical roller is regulated to a predetermined value or less, so that the above-described critical skew angle θ1 can be regulated to the predetermined angle or less.

In addition, the height "H" of the relief groove 2c is the dimension from the track surface 2e to the boundary B2 between the relief groove 2c and the flange surface 2b in a radius direction. In addition, the height "h" of the chamfer of the cylindrical roller is the dimension from the boundary B4 between the rolling surface 1c and the chamfer 1b to the boundary B1 between the chamfer 1b and the end surface 1a in the radius direction.

FIG. 6 shows the relation (solid line) between the skew angle θ of the cylindrical roller 1, and the contact surface pressure P between the cylindrical roller 1 and the flange surface 2a, and the relation (dotted line) between the skew angle θ and the axial thrust force F applied to the cylindrical roller 1 in the cylindrical roller bearing disclosed in the above Japanese Unexamined Patent Publication No. 2003-278745. Although the contact surface pressure P is steeply increased as the skew angle θ is increased in a range 0<θ<θ1, since the critical skew angle θ1 is regulated to the small angle as compared with that shown in FIG. 4, the contact surface pressure P shifts at a value lower than the surface pressure level P0 in which the contact part is abraded (there is no region shown by the hatching in FIG. 4). More specifically, even when the cylindrical roller 1 and the flange 2a come in contact with each other at the boundary B1 and the boundary B2 (state shown in FIG. 2), as long as the skew angle θ is small, the axial thrust force F pressing the cylindrical roller 1 toward the flange 2a is small, so that the contact surface pressure P is relatively small.

In a range θ1<θ<θ2, similar to that shown in FIG. 4, the contact surface pressure P makes a stable shift at a relatively low value although the skew angle θ is increased. When the skew angle θ becomes approximately θ2, the contact surface pressure P is steeply increased again and it becomes the surface pressure level P0 or more after the skew angle θ reaches θ2. However, since the maximum skew angle θmax is regulated to the small angle, the angle range (θ2<θ<θmax) in which the contact surface pressure P exceeds the surface pressure level P0 is narrow.

As described above, the contact surface pressure P is reduced by regulating the critical skew angle θ1 to the small angle and shifting the contact state between the cylindrical roller 1 and the flange 2a from the contact state (shown in FIG. 2) between the boundary B1 and the boundary B2 to the contact state (shown in FIG. 3) between the boundary B1 and the flange 2b at a smaller skew angle, so that the heat generation and the abrasion can be prevented from being generated at the contact part.

According to the cylindrical roller bearing disclosed in the above Japanese Unexamined Patent Publication No. 2003-278745, although the heat generation and abrasion at the contact part between the cylindrical roller and the flange can be prevented to some extent, there is a room for improvement. That is, according to the above Japanese Unexamined Patent Publication No. 2003-278745, there is no consideration of reduction in the contact surface pressure (refer to FIG. 6) in the range of θ1 to θ2. For example, the cylindrical roller bearing for the planet gear in the wind power generation speed-up gear rotates at high speed in a highly-loaded state. In the case of the cylindrical roller bearing used in such highly-loaded and rotating at high speed, it is desirable that the heat generation and abrasion at the contact part is to be further prevented by further reducing the contact surface pressure in the range of θ1 to θ2 in which the contact surface pressure is relatively low.

In addition, as shown in FIG. 6, the first peak of the contact surface pressure is generated by the contact between the boundary B1 (boundary between the end surface and the chamfer of the cylindrical roller) at the upper end of the chamfer of the cylindrical roller, and the boundary B2 (boundary between the relief groove and the flange surface) at the upper end of the relief groove of the track ring. Preferably, the first peak of the contact surface pressure is to be further reduced.

DISCLOSURE OF THE INVENTION

It is an object of the present invention to provide a cylindrical roller bearing suitable for being used in a high-load and high-speed rotation by improving the cylindrical roller bearing disclosed in the above Japanese Unexamined Patent Publication No. 2003-278745.

A cylindrical roller bearing according to the present invention comprises a track ring having flanges on both sides of its track surface and provided with a relief groove at a corner in which at least one of the flanges intersects with the track surface, and a cylindrical roller arranged so that it can freely roll on the track surface and provided with a chamfer at a corner part in which its rolling surface intersects with each end surface, and it is characterized as follows. That is, when it is assumed that the height of the chamfer from the rolling surface of the cylindrical roller is "h" and the curvature radius of the chamfer is "R", the relation such that $1.0 \leq R/h \leq 1.5$ is satisfied.

When the cylindrical roller is skewed on the track surface of the track ring, the boundary between the end surface and the chamfer of the cylindrical roller comes in contact with the flange surface of the track ring. An edge is left at the boundary of the cylindrical roller in general. In order to reduce the contact surface pressure between the cylindrical roller and the flange surface of the track ring, it is desirable that the edge at the boundary of the cylindrical roller is reduced as much as possible so that a continuously curved surface is provided. Thus, according to the present invention, in order to reduce the edge at the boundary, the ratio of the curvature radius of the chamfer to the height of the chamfer of the cylindrical roller is set to be within a range of 1.0 to 1.5. When the ratio is equal to 1.0, the boundary can be a perfectly continuous curved surface without any edge.

Preferably, in order to improve the lubricant state of the sliding contact part between the cylindrical roller and the flange of the track ring, the height "h" of the chamfer is made smaller than the height "H" of the relief groove from the track surface.

In the case where the track ring is the inner ring, the higher the relief groove from the track surface is, the higher the peripheral velocity of the boundary between the relief groove and the flange surface is. As a result, the contact surface pressure between the cylindrical roller and inner ring becomes high. In order to reduce the contact surface pressure, the height of the relief groove is to be reduced. For example, when the diameter of the cylindrical roller is more than 24 mm but not more than 30 mm, the height of the relief groove is to be 1.2 mm or less. When the diameter of the cylindrical roller is more than 30 mm but not more than 40 mm, the height of the relief groove is to be 1.4 mm or less. When the diameter of the cylindrical roller is more than 40 mm but not more than 50 mm, the height of the relief groove is to be 1.6 mm or less.

As described above, according to the present invention, the heat generation and the abrasion at the contact part can be prevented by further reducing the contact surface pressure of the contact part between the cylindrical roller and the flange of the track ring.

BEST MODE FOR CARRYING OUT THE INVENTION

Figure 7:
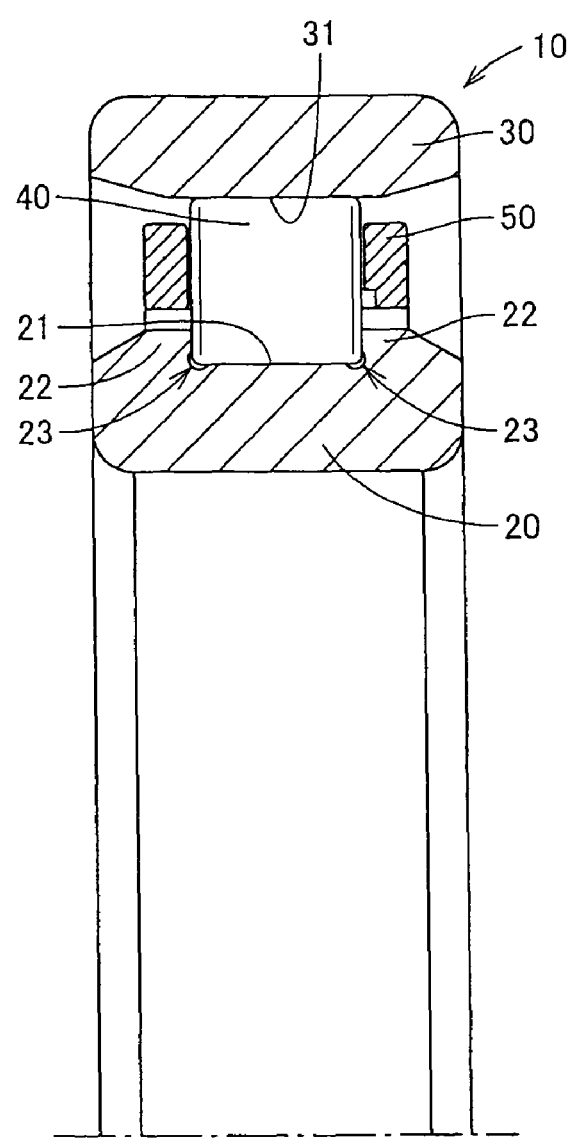
FIG. 7 is a sectional view showing a cylindrical roller bearing according to one embodiment of the present invention.

FIG. 7 shows a cylindrical roller bearing 10 according to one embodiment of the present invention. The cylindrical roller bearing 10 is used in a high-load and high-speed rotating operation in a wind power generation speed-up gear, a machine tool, a jet engine, a gas turbine and the like.

The cylindrical roller bearing 10 comprises an inner ring 20 having a track surface 21 on its outer periphery, an outer ring 30 having a track surface 31 on its inner periphery, a plurality of cylindrical rollers 40 arranged between the track surface 21 of the inner ring 20 and the track surface 31 of the outer ring 30 so as to freely roll, and a retainer 50 retaining the plurality of cylindrical roller bearings 40 at predetermined intervals in a circumferential direction. A flange 22 is provided on each side of the inner ring 20.

Figure 8:
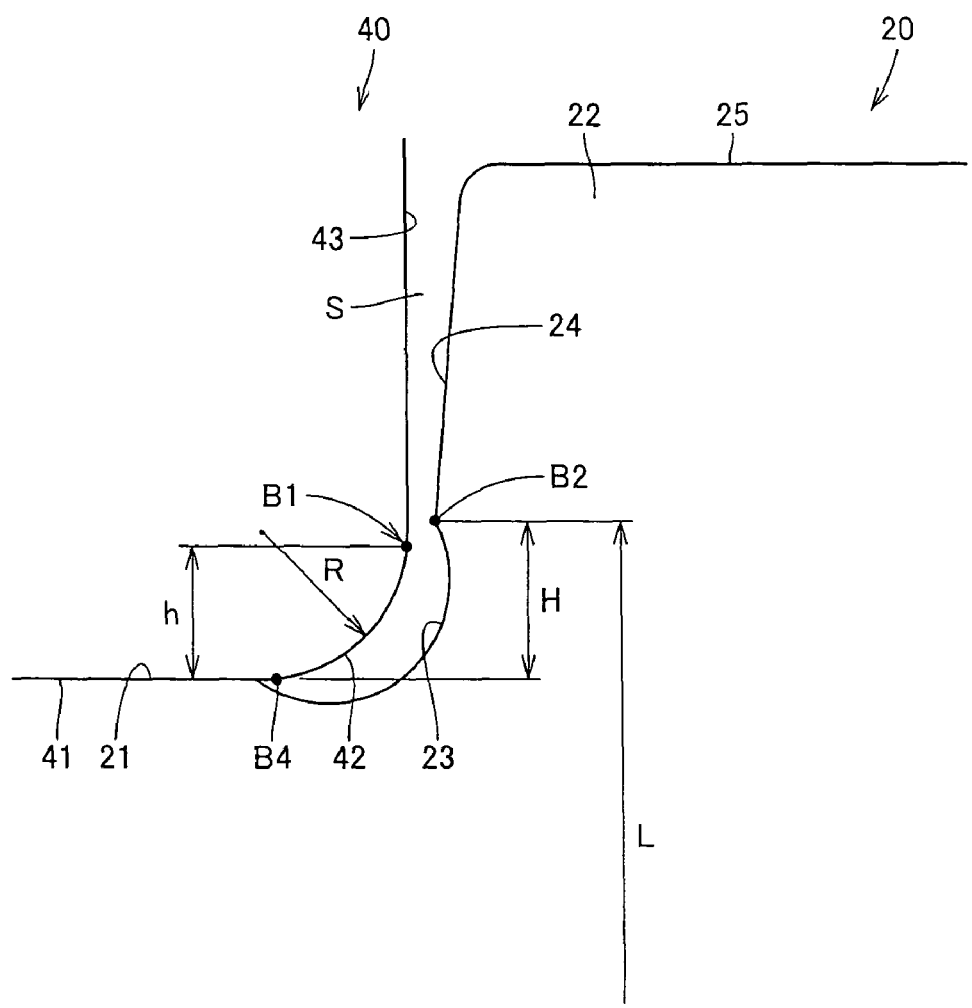
FIG. 8 is an enlarged sectional view showing the end of a cylindrical roller and a flange according to one embodiment of the present invention.

As shown in an enlarged view in FIG. 8, a relief groove 23 is provided at a corner in which a flange surface 24 of the flange 22 and the track surface 21 of the inner ring 20 cross. This relief groove 23 is provided as a relief groove when the track surface 21 and the flange surface 24 are ground. According to this embodiment, the flange surface 24 is a tapered surface slanting so as to be gradually opened in an outer diameter direction, and a chamfer is provided at a corner part in which the flange surface 24 and an outer diameter surface 25 of the flange 22 cross.

A chamfer 42 is provided at the corner in which a rolling surface 41 and end surface 43 of the cylindrical roller 40 cross. The distance between the flange surfaces 24 opposed to each other in an axial direction is provided so as to be a little larger than the length of the cylindrical roller 40 and a guide clearance S is provided between the end surface 43 of the cylindrical roller 40 and the flange surface 24.

Edges are surely provided at a boundary B4 between the rolling surface 41 and chamfer 42 of the cylindrical roller 40, and a boundary B1 between the end surface 43 and the chamfer 42. This is because the rolling surface 41 and the end surface 43 are ground after the heat treatment of the cylindrical roller 40.

As described above, in order to lower the contact surface pressure between the cylindrical roller 40 and the flange surface 24 of the inner ring 20, it is preferable that the edge (angle) at the boundary B1 between the chamfer 42 and the end surface 43 of the cylindrical roller 40 is reduced as much as possible so that a continuous curved surface is provided.

Thus, according to the illustrated embodiment, when it is assumed that the height of the chamfer of the cylindrical roller 40 from the rolling surface 41 is "h", and the curvature radius of the chamfer 43 is "R", the cylindrical roller 40 is processed so as to satisfy the relation such that $1.0 \leq R/h \leq 1.5$. When the value of R/h is 1.0, since the height "h" and the curvature radius "R" of the chamfer 42 are the same, the end surface 43 becomes a tangent line of the chamfer 42, so that the edge does not exist. The upper limit value of the R/h is set to 1.5 because while the value R/h of the conventional cylindrical roller is approximately in a range of 2.0 to 3.0, the contact surface pressure between the cylindrical roller 40 and the flange surface 24 is to be lower than that of the conventional cylindrical roller bearing.

Figure 1:
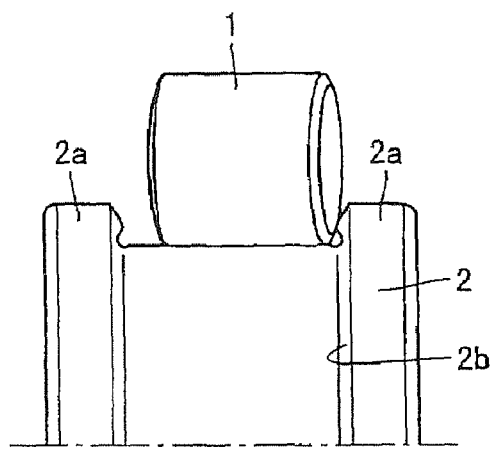
FIG. 1 is a view schematically showing a state in which a cylindrical roller is skewed and it is in contact with one flange.
Figure 2:
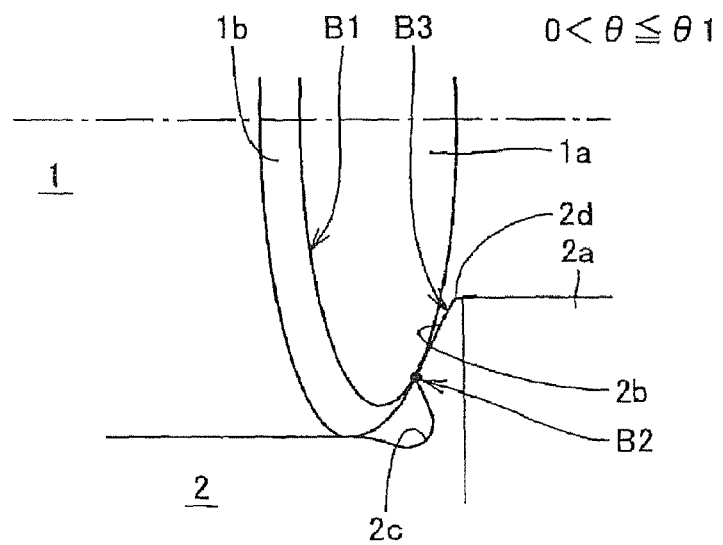
FIG. 2 is a view showing a state in which the boundary between the end surface and the chamfer of the cylindrical roller is in contact with the boundary between a flange surface and a relief groove.
Figure 3:
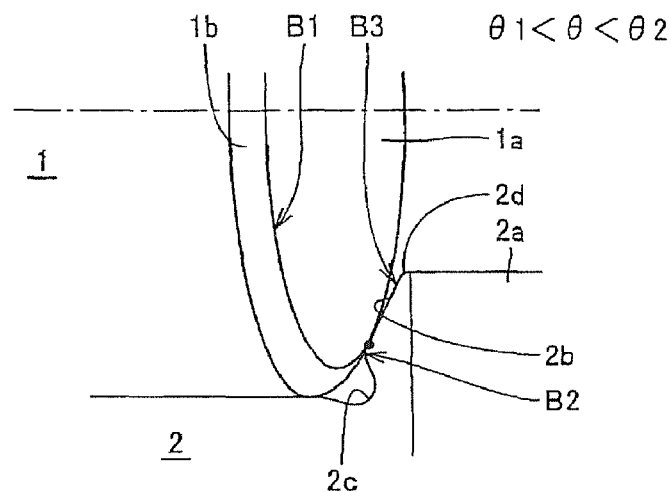
FIG. 3 is a view showing a state in which the boundary between the end surface and the chamfer of the cylindrical roller is in contact with the flange surface.
Figure 4:
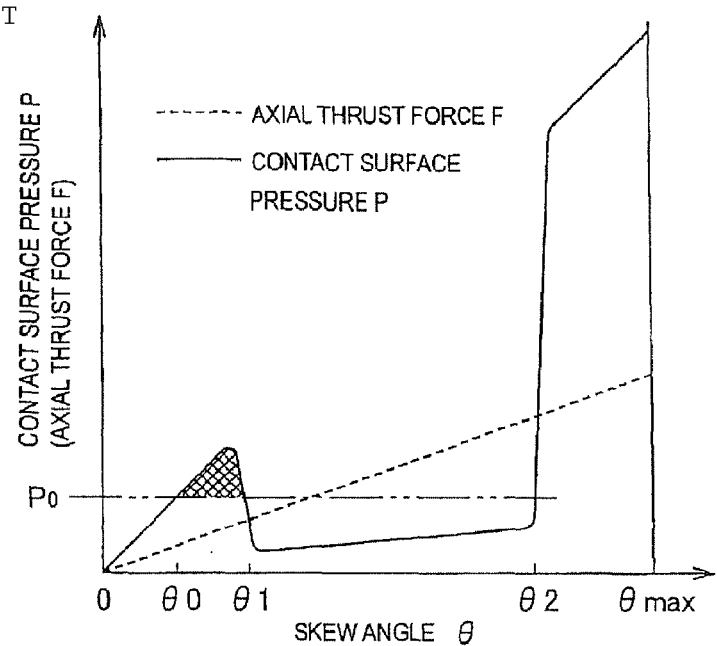
FIG. 4 is a view showing the relation (solid line) between the skew angle θ of the cylindrical roller, and the contact surface pressure P between the cylindrical roller and the flange, and the relation (dotted line) between the skew angle θ and the axial thrust force F applied to the cylindrical roller.
Figure 5:
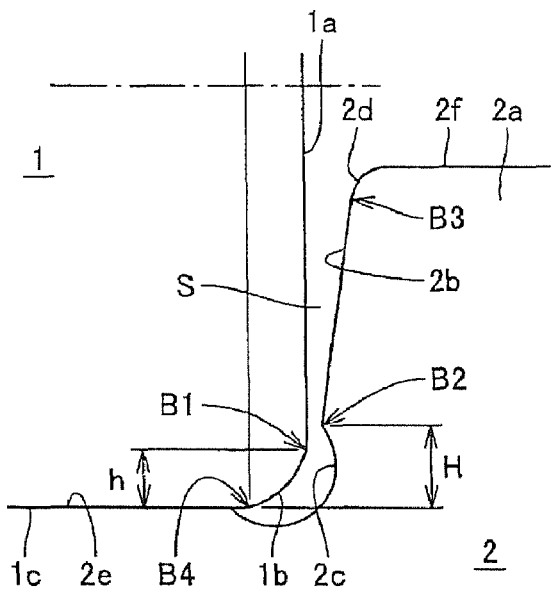
FIG. 5 is an enlarged sectional view showing a peripheral part of the end of the cylindrical roller and the flange.
Figure 6:
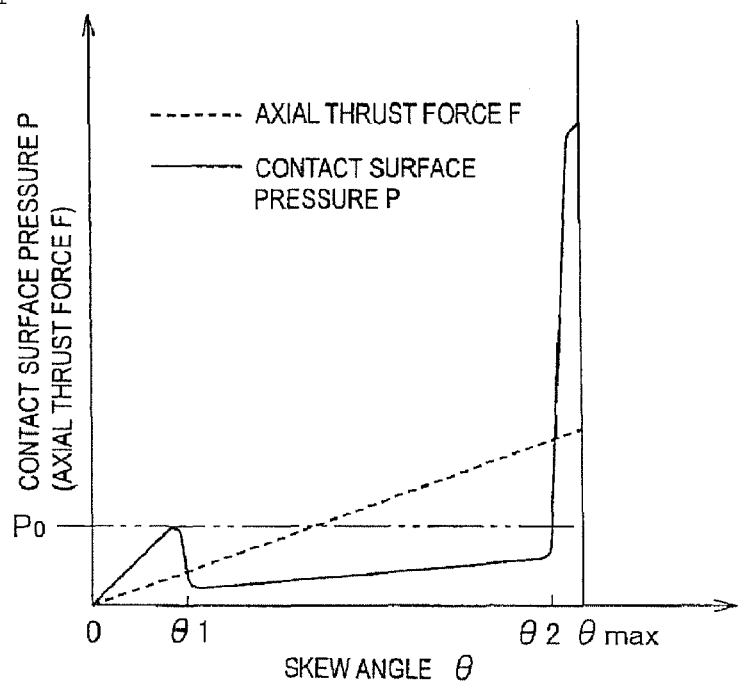
FIG. 6 shows the relation (solid line) between the skew angle θ of the cylindrical roller, and the contact surface pressure P between the cylindrical roller and the flange, and the relation (dotted line) between the skew angle θ and the axial thrust force F applied to the cylindrical roller in the cylindrical roller bearing disclosed in the above Japanese Unexamined Patent Publication No. 2003-278745.

As described above with reference to FIG. 6, the first peak of the contact surface pressure is generated by the contact between the boundary B1 at the upper end of the chamfer 42 of the cylindrical roller 40, and a boundary B2 at the upper end of the relief groove 23 of the inner ring 20. According to this embodiment, in order to reduce the value of the first peak of the contact surface pressure and improve a lubricant state of a sliding contact part, the height "h" of the chamfer is made smaller than the height "H" of the relief groove and the height "H" of the relief groove is made smaller than the height of the relief groove of the conventional roller bearing. When the height "H" (height of the relief groove 23) of the boundary B2 between the relief groove 23 and the flange surface 24 of the inner ring 20 is increased, a radius "L" from the rotation axis line of the inner ring 20 to the boundary B2 is increased and the peripheral velocity of the boundary B2 is increased. The higher the peripheral velocity at the boundary B2 is, the higher the contact surface pressure between the boundary B1 of the cylindrical roller 40 and the boundary B2 of the inner ring 20 is. In this respect, it is desirable to reduce the height "H" of the boundary B2 in order to reduce the first peak of the contact surface pressure.

For example, when the diameter of the cylindrical roller 40 is more than 24 mm but not more than 30 mm, the height "H" of the relief groove 23 is set to 1.2 mm or less. In addition, when the diameter of the cylindrical roller 40 is more than 30 mm but not more than 40 mm, the height "H" of the relief groove 23 is set to 1.4 mm or less. Furthermore, when the diameter of the cylindrical roller 40 is more than 40 mm but not more than 50 mm, the height "H" of the relief groove 23 is set to 1.6 mm or less.

The inventor of the present invention measured each part of the conventional cylindrical roller bearing that supports a planet gear of a wind power generation speed-up gear, and measured each part of the invented bearing. The measured result is shown in the following table 1.

TABLE 1

Unit mm

| Cylindrical roller diameter | | Relief groove height | | Cylindrical roller chamfer | | | | | |
|---|---|---|---|---|---|---|---|---|---|
| | | | | Conventional bearing | | | Invented bearing | | |
| More than | Not more than | Conventional bearing | Invented bearing | Chamfer height h (nominal) | Chamfer curvature diameter R | Ratio R/h | Chamfer height h (nominal) | Chamfer curvature diameter R | Ratio R/h |
| 24 | 30 | 1.44 | 1.1 | 1.2 | 2.5 | 2.1 | 0.8 | 1.2 | 1.5 |
| 30 | 40 | 1.73 | 1.3 | 1.5 | 3 | 2 | 1 | 1.4 | 1.4 |
| 40 | 50 | 1.73 | 1.5 | 2 | 4 | 2 | 1.2 | 1.6 | 1.3 |

As can be clear from the measured result shown in Table 1, while the value R/h of the conventional bearing is 2 or more, the value R/h of the invented bearing is 1.5 or less. In addition, as for the height of the relief groove, the invented one is considerably smaller then that of the conventional one.

Furthermore, although the inner ring has flanges on both sides of the track surface and the relief grooves are provided at the corner in which the flange surfaces of the flanges on both sides and the track surface cross in the illustrated embodiment, a relief groove may be provided only at one corner in which one flange surface and the track surface cross in another embodiment.

Furthermore, when the outer ring has a flange surface, it is preferable that the dimensional relation as described above is applied to the relation between the flange surface of the outer ring and the cylindrical roller. In addition, it is to be noted that the term "track ring" described in the claim includes one or both of the inner ring and the outer ring.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a cylindrical roller bearing used in a high-load and high-speed rotating operation in a wind power generation speed-up gear, a machine tool, a jet engine, a gas turbine and the like.

The invention claimed is:
1. A cylindrical roller bearing comprising:
a track ring having flanges on both sides of its track surface, and provided with a relief groove at a corner in which at least one of said flanges intersects with the track surface; and
a cylindrical roller arranged so that it can freely roll on said track surface and provided with a chamfer at a corner part in which its rolling surface intersects with each end surface, characterized in that when it is assumed that the height of the chamfer from said rolling surface is "h" and the curvature radius of the chamfer is "R", the relation such that $$1.0 \leq R/h \leq 1.5$$

is satisfied, and the height "h" of said chamber is smaller than the height "H" of the relief groove from said track surface.

2. The cylindrical roller bearing according to claim 1, wherein the diameter of said cylindrical roller is more than 24 mm but not more than 30 mm, and the height of said relief groove is 1.2 mm or less.

3. The cylindrical roller bearing according to claim 1, wherein the diameter of said cylindrical roller is more than 30 mm but not more than 40 mm, and the height of said relief groove is 1.4 mm or less.

4. The cylindrical roller bearing according to claim 1, wherein the diameter of said cylindrical roller is more than 40 mm but not more than 50 mm, and the height of said relief groove is 1.6 mm or less.

* * * * *